United States Patent [19]

Mansoor et al.

[11] Patent Number: 5,347,690
[45] Date of Patent: Sep. 20, 1994

[54] FASTENER APPARATUS FOR AN AUTOMOTIVE BODY PANEL COMPONENT

[75] Inventors: Dhafer Y. Mansoor, West Bloomfield; Walter J. Kallenberg, Warren, both of Mich.

[73] Assignee: Ford Motor Company, Dearborn, Mich.

[21] Appl. No.: 990,970

[22] Filed: Dec. 15, 1992

[51] Int. Cl.⁵ ............................................. A44B 21/00
[52] U.S. Cl. ...................................... 24/295; 24/294; 24/458
[58] Field of Search ............... 24/289, 292, 293, 294, 24/295, 297, 458

[56] References Cited

U.S. PATENT DOCUMENTS

| | | | |
|---|---|---|---|
| 2,751,106 | 6/1956 | Schrader | 24/295 X |
| 2,976,972 | 3/1961 | Raymond | 24/294 X |
| 4,043,579 | 8/1977 | Meyer . | |
| 4,261,151 | 4/1981 | Ito . | |
| 4,285,103 | 8/1981 | Inamoto . | |
| 4,354,566 | 10/1982 | Yuda . | |
| 4,373,826 | 2/1983 | Inamoto et al. . | |
| 4,683,622 | 8/1987 | Oehlke | 24/295 X |
| 4,840,334 | 6/1989 | Kikuchi . | |
| 5,101,540 | 4/1992 | Roof et al. | 24/295 X |

FOREIGN PATENT DOCUMENTS

| | | | |
|---|---|---|---|
| 124540 | 1/1946 | Australia | 24/295 |
| 82850 | 4/1988 | Japan . | |
| 171359 | 7/1990 | Japan . | |
| 823004 | 11/1959 | United Kingdom | 24/294 |

Primary Examiner—Laurie K. Cranmer
Attorney, Agent, or Firm—Raymond L. Coppiellie; Roger L. May

[57] ABSTRACT

A one-piece resilient clip for fastening an exterior automotive component to an automotive body includes a first U-shaped section for receiving a component tab therein, the first U-shaped section having a plurality of tab engaging barbs therein for engaging the tab and preventing axial withdrawal of the tab. The fastener further includes a second U-shaped section axially aligned with the first U-shaped section which is inserted into an aperture in the automotive body. The second U-shaped section has a first-leg portion and a second-leg portion, the second leg portion including a positive locking tab member which resiliently compresses upon insertion of the second U-shaped section into the aperture. The locking tab member springs out and engages the body to provide a snap-fit retention to resist axial withdrawal of the fastener apparatus from the aperture.

6 Claims, 2 Drawing Sheets

FASTENER APPARATUS FOR AN AUTOMOTIVE BODY PANEL COMPONENT

BACKGROUND OF THE INVENTION

1. Field of the Invention

The present invention relates generally to an apparatus for fastening an automotive exterior body panel component to an automotive body. More particularly, the present invention relates to a one-piece fastener for fastening an automotive radiator grill panel to the automotive body.

2. Disclosure Information

In the prior art, it has been heretofore known to secure exterior automotive body panels to the automotive body with a variety of fasteners. Typically, such fasteners included threaded screws and the like inserted into expandable hollow fastener stems received in holes in the automotive body. Upon tightening of the threaded screw, the hollow fastener stem expands, thus securing the exterior panel to the body. An example of such a fastener using a threaded rod is also shown in U.S. Pat. No. 4,354,566. However, threaded fasteners can be labor and time consuming, especially where a large number of fasteners is required to secure the body panel component to the vehicle.

A variety of "push-on" or "snap-in" fasteners have been proposed, manufactured from either metal or a synthetic polymeric material. The synthetic polymeric fasteners, typically formed of plastic, generally comprise two sets of fastening components, one part secured in the hole in the automotive body and the other part either formed integrally or attached to the exterior body panel to be secured. However, the plastic fasteners have shortcomings in that when the exterior component is removed from the automotive body, the fastener typically is destroyed and must be replaced. Furthermore, if the body opening is larger than a defined or required specification, the plastic fastener may not securely fit into the opening causing a rattle of the component.

While various other types of metal and plastic spring clip fasteners have been proposed, it is highly important to productivity and performance to employ particular fasteners selected for their best usage and intended purpose. Accordingly, some situations call for threaded and some for threadless fasteners. Threadless fasteners are often advantageous when snap-in applications are acceptable and where a large number of threaded fasteners would be required to secure the component to the automotive body. An advantageous and illustrative application of push-on fasteners according to the present invention is provided by the assembling of an automotive radiator grill panel to the automotive body.

SUMMARY OF THE INVENTION

In view of the foregoing, there is disclosed herein a one piece fastener apparatus for fastening an exterior automotive body panel component having a tab to an automotive body having an aperture adapted to receive the tab therein. The apparatus comprises a first U-shaped section adapted to receive the tab therein, the first U-shaped section having a plurality of tab engaging barbs disposed therein for engaging the tab and preventing axial withdrawal of the tab therefrom. The apparatus further includes a second U-shaped section axially aligned with the first U-shaped section and which is adapted to be inserted into the aperture. The second U-shaped section has a first leg portion and a second leg portion, the second leg portion being inclined at a predetermined angle away from the first leg portion to define a ramped surface thereby. The apparatus further includes a positive locking tab member formed on the second leg portion of the second U-shaped section, the tab member being configured to resiliently compress upon insertion of the apparatus into the aperture and being operative to spring out and engage the body and provide a snap-fit retention to resist axial withdrawal of the apparatus from the aperture. The present invention has particular utility in securing an automotive radiator grill panel to an automotive body.

An advantage of the present invention is to provide a fastener clip which is more economical and time saving than other prior art known fasteners.

These and other objects, features, and advantages of the present invention will become apparent from the drawings, detailed description and claims which follow.

DETAILED DESCRIPTION OF THE PREFERRED EMBODIMENTS

Figure 1:
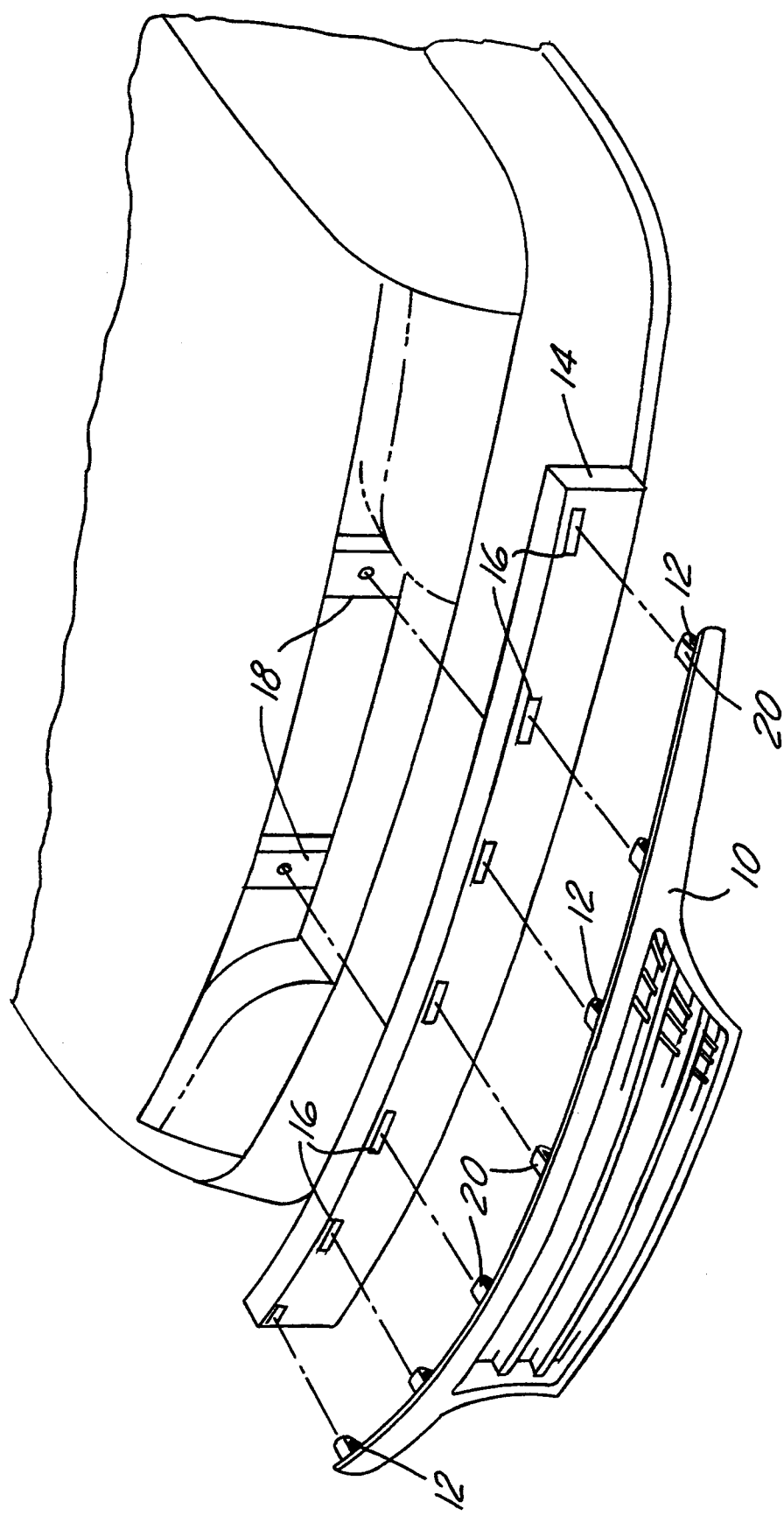
FIG. 1 is an exploded perspective view showing the installation of a radiator grill panel to an automotive body according to the present invention.
Figure 2:
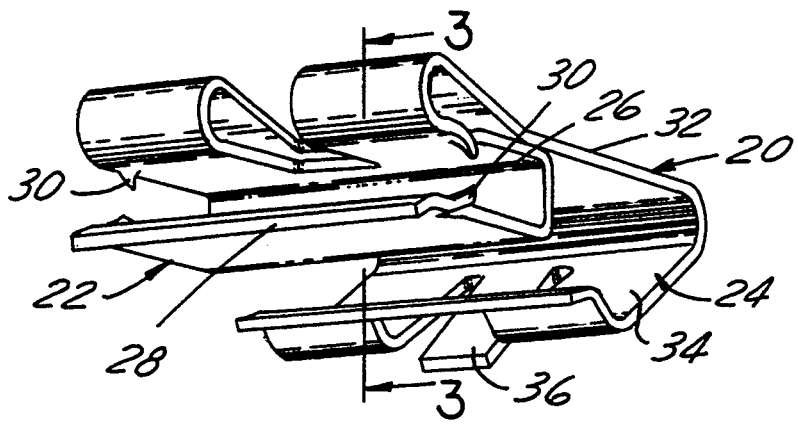
FIG. 2 is a prospective view of a fastener apparatus structured in accord with the principles of the present invention.

Referring now to the drawings, FIG. 1 shows an exploded view of the installation of an automotive radiator grill panel 10 having a plurality of planar tabs 12 formed integrally therewith. The grill panel 10 is secured to a grill opening panel 14 having a plurality of apertures 16 therein for receiving tabs 12. The grill opening panel 14 is secured to the body 18 of the vehicle by known fastening devices. Alternatively, the radiator grill panel 10 may be secured directly to the automotive body 18 in accordance with the present invention. A one piece fastener clip 20 is secured to each of the tabs 12 of the radiator grill 10 to secure the radiator grill panel 10 to the grill opening panel 14 as will be described below, Referring now to FIGS. 2 and 3, each of the fastener clips 20 includes a first U-shaped section 22 and a second U-shaped section 24 axially aligned with the first U-shaped section 22. The first U-shaped section 22 includes a first leg portion 26 and a second leg portion 28. Each of the leg portions 26, 28 includes a pair of tab engaging barbs 30 which are inclined at a predetermined angle opposite to the direction of insertion of the tab into the first U-shaped portion. The tab engaging barb 30 prevent axial withdrawal of the tab from the first U-shaped portion as will be shown below.

Figure 3:
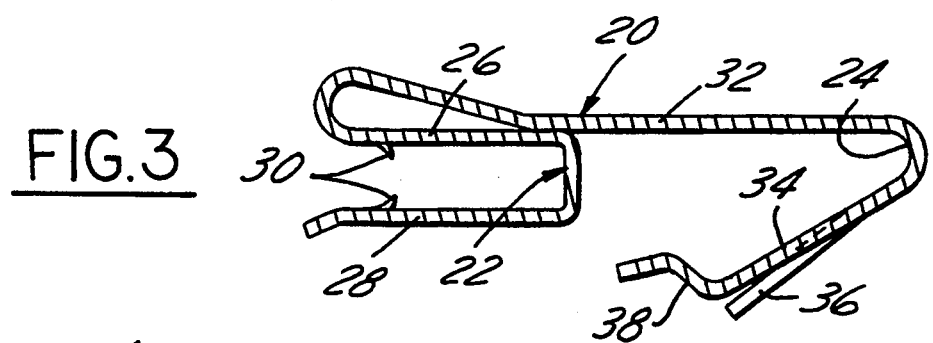
FIG. 3 is a cross-sectional view of FIG. 2 taken along lines 3—3.

The second U-shaped portion 24 also includes a first leg portion 32 and a second leg portion 34. As shown in FIG. 3, the first leg portion 32 extends axially over the first U-shaped section 22 which is folded back upon the first leg portion 32 of the second U-shaped section 24.

Folding the first U-shaped section 22 back upon the first leg portion 32 increases the strength and rigidity of the clip 20.

The second leg portion 34 is inclined at a predetermined angle away from the first leg portion 32 of the second U-shaped section 24 and defines a ramped surface thereby. The predetermined angle can range between 20–60 degrees and preferably is approximately 30 degrees, The second U-shaped section 24 is inserted into the body aperture 16 and prevents axial withdrawal of the fastener clip 20 therefrom. This is accomplished by a positive locking tab member 36 formed in the second leg portion 34 of the second U-shaped section 24.

Figure 4:
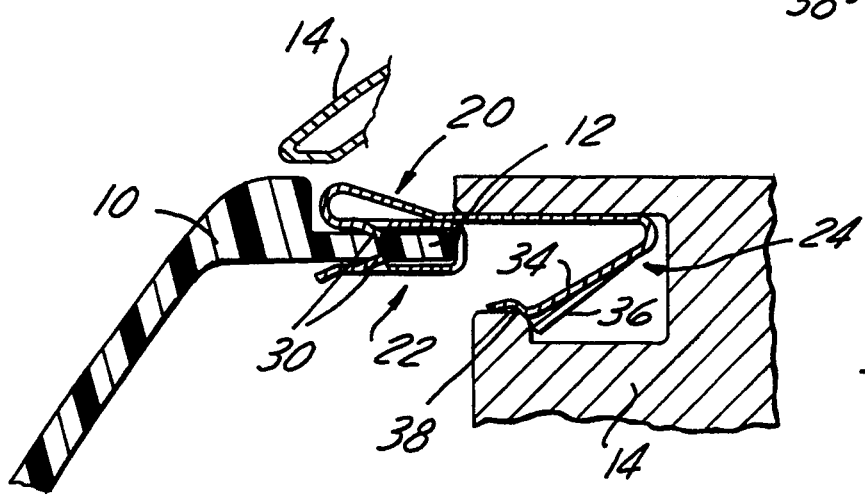
FIG. 4 is a cross-sectional view of the present invention in the installed condition.

As shown in FIG. 4, the tab member 36 resiliently compresses upon insertion of the fastener clip 20 into the aperture 16 and springs out and engages the body 14 to provide a snap-fit retention which resists axial withdrawal of the clip from the aperture. To remove the grill panel from the automotive body, the locking tab member 36 is depressed by means of a tool, such as a screw driver, and the grill panel 10 with its associated fastener 20 can be pulled out of the aperture 16.

The fastener clip 20 of the present invention further reduces the rattling of the clip 20 in the aperture 16. The second leg portion 34 of the second U-shaped section 24 includes a shoulder 38 which contacts one edge of the body at the aperture 16 as shown in FIG. 4. Since the second leg portion 34 of the second U-shaped section 24 is flexible, a constant elastic force is applied against the body 18 at the aperture 16 by the second leg portion 34. In this way, loosening and subsequent rattling of the clip 20 within the aperture 16 is minimized.

Figure 5:
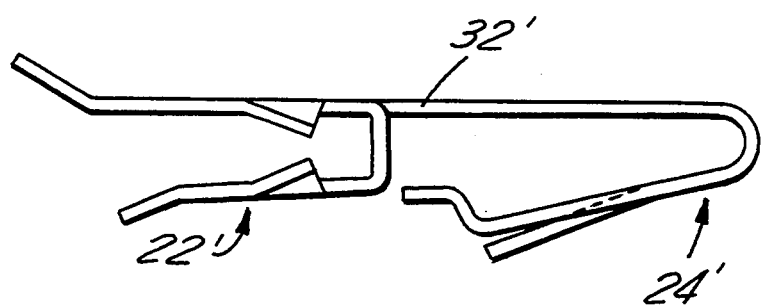
FIG. 5 is a cross-sectional view of an alternate embodiment of a fastener apparatus according to the present invention.

FIG. 5 shows an alternative embodiment of the present invention wherein the first U-shaped section 22' is not folded back over onto the first leg portion 32' of the second U-shaped section 24'. All other aspects of the alternative embodiment are the same as that described above with reference to FIG. 3.

The fastener clip 20 of the present invention is typically formed from a metal blank in a stamping operation. However, the present invention contemplates that the fastener clip 20 may be formed from a variety of materials including plastics through an injection molding process. To facilitate ease of insertion of the clip 20 into the aperture 16 and to prevent potential scratching of the automotive body, the clip 20 may be coated with an epoxy resin of any type commercially available in the art.

Being described for use in securing a radiator grill panel to an automotive body, the present invention is not meant to be limited to such. The present invention can be used to secure a variety of exterior automotive components to the automotive body. While only two embodiments of the present invention have been described, others may be possible without departing from the scope of the following claims.

What is claimed is:

1. A one-piece fastener apparatus for fastening an automotive exterior body panel component having a tab to an automotive body having a aperture adapted to receive the tab therein, said apparatus comprising:
   a first U-shaped section adapted to receive said tab therein, said first U-shaped section having a plurality of tab engaging barbs disposed therein for engaging said tab and preventing axial withdrawal of said tab therefrom;
   a second U-shaped section axially aligned with said first U-shaped section and adapted to be inserted into said aperture, said second U-shaped section having a first leg portion and a second leg portion, said second leg portion being resiliently flexible relative to said first leg portion and inclined at a predetermined angle away from said first leg portion to define a ramped surface thereby;
   said first U-shaped section being folded back into a contact relationship with said first leg portion of said second U-shaped section, said contact relationship being operative to increase the strength and rigidity of said apparatus;
   a shoulder disposed on said second leg portion of said second U-shaped section, said shoulder being adapted to contact said body, said shoulder and said second leg portion being cooperative to prevent rattling of said apparatus in said aperture; and
   a positive locking tab member formed on said second leg portion of said second U-shaped section, said tab member being configured to resiliently compress upon insertion of said apparatus into said aperture and being operative to spring out and engage said body and provide a snap-fit retention to resist axial withdrawal of said apparatus from said aperture.

2. An apparatus according to claim 1, wherein said first U-shaped section includes a first and second leg portion, said first and second leg portions including a pair of tab engaging barbs, each one of said pair of barbs being disposed at an outer edge of each of said leg portions.

3. A one piece resilient clip for fastening an automotive grill panel having a plurality of tabs to an automotive body having a plurality of apertures for receiving the tabs therein, the clip comprising:
   a first U-shaped section adapted to receive a grill panel tab therein, said first U-shaped section having a plurality of tab engaging barbs disposed therein for engaging said tab and preventing axial withdrawal of said tab therefrom;
   a second U-shaped section axially aligned with said first U-shaped section and adapted to be inserted into said body aperture, said second U-shaped section having a first leg portion and a second leg portion, said second leg portion being resiliently flexible relative to said first leg portion, and inclined at a predetermined angle away from said first leg portion to define a ramped surface thereby;
   said first U-shaped section being folded back into a contact relationship with said first leg portion of said second U-shaped section, said contact relationship being operative to increase the strength and rigidity of said apparatus;
   a shoulder disposed on said second leg portion of said second U-shaped section, said shoulder being adapted to contact said automotive body, and said shoulder and said second leg portion being cooperative to prevent rattling of said apparatus in said aperture; and
   a positive locking tab member formed on said second leg portion of said second U-shaped section, said tab member being configured to resiliently compress upon insertion of said clip into said aperture and being operative to spring out and engage said body and provide a snap-fit retention to resist axial withdrawal of said clip from said aperture.

4. A clip according to claim 3, wherein said clip includes a coating of an epoxy resin to facilitate insertion of said clip into said body and to prevent scratching the surface of said body.

5. A clip according to claim 3, wherein said first U-Shaped section includes a first and second leg portion, said first and second leg portions including a pair of tab engaging barbs, each one of said pair of barbs being disposed at an outer edge of each of said leg portions.

6. A Clip according to claim 3, herein said clip is formed from a metal blank in a stamping operation.

* * * * *